United States Patent
Nilsson et al.

(10) Patent No.: US 8,281,746 B2
(45) Date of Patent: Oct. 9, 2012

(54) POSITIONING OF TEAT CUPS

(75) Inventors: Mats Nilsson, Solna (SE); Anders Hallström, Vendelso (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 12/934,674

(22) PCT Filed: Mar. 19, 2009

(86) PCT No.: PCT/SE2009/000145
§ 371 (c)(1),
(2), (4) Date: Nov. 30, 2010

(87) PCT Pub. No.: WO2009/120129
PCT Pub. Date: Oct. 1, 2009

(65) Prior Publication Data
US 2011/0061596 A1   Mar. 17, 2011

(30) Foreign Application Priority Data
Mar. 27, 2008   (SE) ...................................... 0800684

(51) Int. Cl.
*A01J 5/007* (2006.01)
(52) U.S. Cl. ................. 119/14.08; 119/14.02; 119/14.14
(58) Field of Classification Search ............... 119/14.01, 119/14.02, 14.08, 14.1, 14.14, 14.18, 14.11, 119/14.13, 14.38, 14.45, 14.46
See application file for complete search history.

(56) References Cited

U.S. PATENT DOCUMENTS
5,784,282 A * 7/1998 Abitbol et al. ............... 700/186
5,943,476 A   8/1999 Dougherty et al.
6,244,215 B1 * 6/2001 Oosterling ................. 119/14.02
2010/0186675 A1 * 7/2010 Van Den Berg ........... 119/14.03
2010/0192862 A1 * 8/2010 Van Den Berg ........... 119/14.08
2010/0289649 A1 * 11/2010 Holmgren et al. ......... 340/573.3

FOREIGN PATENT DOCUMENTS
| GB | 2 258 382 A | 2/1993 |
| WO | 00/04764 A1 | 2/2000 |
| WO | WO 2005094565 A1 * | 10/2005 |
| WO | 2005/122753 A1 | 12/2005 |
| WO | 2006/073303 A1 | 7/2006 |
| WO | 2007/027137 A1 | 3/2007 |
| WO | 2008/008036 A1 | 1/2008 |

OTHER PUBLICATIONS

International Search Report, dated Jun. 12, 2009, from corresponding PCT application.

* cited by examiner

*Primary Examiner* — Rob Swiatek
*Assistant Examiner* — Lisa Tsang
(74) *Attorney, Agent, or Firm* — Young & Thompson

(57) ABSTRACT

An arrangement for fetching a teat cup from a teat cup magazine in which each teat cup has a respective fixed position includes a reference entity in a fixed spatial relationship to the teat cup magazine and each teat cup stored therein; a remote detecting element that registers wireless energy reflected by the reference entity, and based thereon determines a respective position for the teat cup relative to a robotic arm. The robotic arm carries a gripper element configured to hold the teat cup during removal thereof from the teat cup magazine. The reference entity is configured to allow the remote detecting element to receive wireless energy reflected against the reference entity while moving the robotic arm towards the least one teat cup for removing the at least teat cup from the teat cup magazine.

26 Claims, 4 Drawing Sheets

US 8,281,746 B2

POSITIONING OF TEAT CUPS

THE BACKGROUND OF THE INVENTION AND PRIOR ART

The present invention relates generally to automatic milking of animals. More particularly the invention relates to an arrangement for fetching teat cups according to the preamble of claim 1 and a milking installation according to claim 13. Moreover, the invention relates to a method according to the preamble of claim 14, a computer program according to claim 24 and a computer readable medium according to claim 25.

The technical solutions for automatic milk extraction are becoming increasingly efficient and sophisticated. For example, today's milking robots allow a completely automatic milking procedure. In movable milking parlors, however, a human operator normally needs to be involved in at least some steps of the milking procedure. Of course, for enhanced efficiency it is desirable to minimize the involvement of a human operator. Therefore, it would be advantageous if one or more milking robots could be engaged in a milking-parlor installation to service the milking machines therein. Nevertheless, due to the multitude of moving parts, this is associated with particular problems.

The published international patent application WO2008/008036 describes a solution for automatically recognizing and determining the position of teat cups. The published international patent applications WO2005/122753 and WO2007/027137 disclose magnetic gripper devices and strategies specifically devised to manipulate teat cups by means of a milking robot arm.

Although the above-mentioned designs may be efficient as such there is room for improvement regarding rotary-parlor implementations. Namely here, the position of the teat cup magazine and the teat cups stored therein varies over time, and therefore it is a challenging task to control a milking robot arm to withdraw the teat cups from the teat cup magazine.

SUMMARY OF THE INVENTION

The object of the present invention is therefore to alleviate the problems above and thus offer an efficient, reliable and flexible solution for fetching teat cups in a teat cup magazine where the positional relationship between the teat cup magazine and a robotic arm for fetching the teat cups is variable.

According to one aspect of the invention, the object is achieved by the initially described arrangement, wherein the arrangement includes a reference entity, which has a fixed spatial relationship to the teat cup magazine, and each teat cup therein. Moreover, the reference entity is configured to allow the remote detecting means to receive wireless energy reflected against the reference entity while moving a robotic arm towards at least one teat cup for removing the at least teat cup from the teat cup magazine. Hence, the reference entity has such dimensions and a location relative to the remote detecting means that this means can "see" the reference entity during the process of controlling the gripper means towards the teat cup(s). Naturally, this does not preclude that the reference entity is "visible" (detectable) also when the robotic arm is static, for instance prior to initiating the movement towards the teat cup(s).

This arrangement is advantageous because it guarantees a reliable and accurate positioning of the teat cups irrespective of any initial uncertainty regarding where the teat cups are located relative to the robotic arm.

According to one preferred embodiment of this aspect of the invention, the reference entity is physically separated from each of the at least one teat cup. In other words, the reference entity does not form part of any of the teat cups. This renders the solution more cost efficient and flexible. For instance, one or more teat cups may be replaced without requiring a recalibration of the arrangement.

According to another preferred embodiment of this aspect of the invention, the reference entity includes a first rod member having a general cylindrical shape. Preferably, the first rod member is oriented such that a symmetry axis thereof is essentially parallel with a respective symmetry axis of each of the at least one teat cup when located in the teat cup magazine. Namely, this allows a good position accuracy in a plane perpendicular to the symmetry axes of the teat cups, and it is primarily important to determine the teat cup positions in such a plane, since generally the largest variations occur in this plane.

According to yet another preferred embodiment of this aspect of the invention, the control means is specifically configured to determine a respective two-dimensional position estimate of the at least one teat cup in a plane perpendicular to the symmetry axis of the first rod member. The position estimate is here based on wireless energy reflected against the first rod member.

According to still another preferred embodiment of this aspect of the invention, the reference entity also includes a second rod member having a general cylindrical shape. Preferably, the rod members are arranged such that wireless energy reflected against both the first and second rod members is receivable by the remote detecting means while moving the robotic arm towards the at least one teat cup for removing the at least one teat cup from the teat cup magazine. In addition to improving the reliability, this also enables a further enhancement of the positioning accuracy.

The second rod member may either be oriented such that a symmetry axis thereof is essentially parallel with the symmetry axis of the first rod member, or such that the first and second rod members are non-parallel to one another. In the former case, the control means is configured to determine a rotation angle of the at least one teat cup in a plane in the primary reference system, which plane is perpendicular to the symmetry axes of the first and second rod members. The rotation angle is determined based on wireless energy reflected against both the first and second rod members. Namely, depending on the rotation angle, the respective distances to the rod members vary, and as a further effect, the distance between the rod members appears to vary from the point-of-view of the remote detection means.

If instead, the first and second rod members are non-parallel to one another, i.e. the second rod member has an angle to the first rod member, the control means is configured to determine a three-dimensional position estimate of the at least one teat cup in the primary reference system based on wireless energy reflected against both the first and second rod members. Here, a two-dimensional position estimate is determined in a plane based on the first rod member as described above. An elevation measure perpendicular to this plane is determined based on a distance between reflections registered on the first and second rod members. Namely, due to said angle between the rod members there is a linear relationship between this reflection distance and the elevation measure.

According to a further preferred embodiment of this aspect of the invention, the remote detecting means includes: a laser source and at least one laser detector, a radar, a sonar, and/or an imaging device, e.g. in the form of a stereo camera. Hence, the at least one teat cup can be positioned in a straightforward and efficient manner also in comparatively challenging environments.

According to another aspect of the invention, the object is achieved by a milking installation configured to automatically extract milk from at least one animal, wherein the installation includes at least one of the above-described arrangements.

According to another aspect of the invention, the object is achieved by the initially described method, wherein it is presumed that a positional relationship between a primary reference system for the robotic arm and a secondary reference system for the at least one teat cup is variable. It is further presumed that a reference entity is provided which has a fixed spatial relationship to the teat cup magazine. The method involves receiving wireless energy reflected against the reference entity while moving the robotic arm towards the at least teat cup in the teat cup magazine for removing the at least teat cup therefrom. Based on the received wireless energy the movement of the robotic arm is controlled. The advantages of this method, as well as the preferred embodiments thereof, are apparent from the discussion hereinabove with reference to the proposed arrangement.

According to a further aspect of the invention, the object is achieved by a computer program, which is loadable into the internal memory of a computer, and includes software for controlling the above proposed method when said program is run on a computer.

According to another aspect of the invention, the object is achieved by a computer readable medium, having a program recorded thereon, where the program is to control a computer to perform the above-proposed method.

Further advantages, advantageous features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED
EMBODIMENTS OF THE INVENTION

Figure 1:
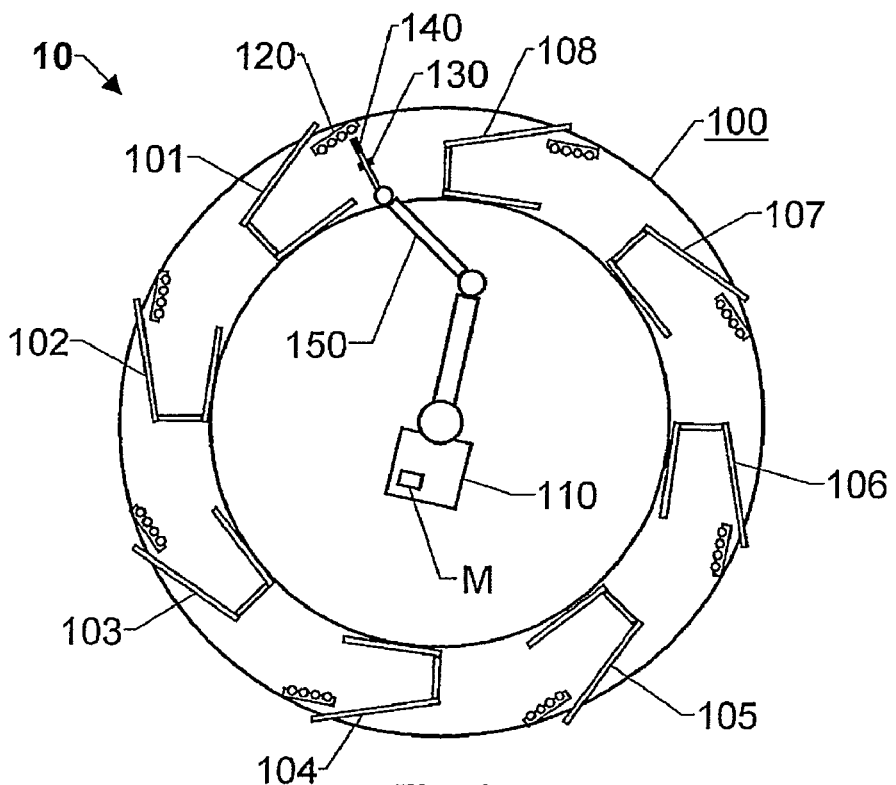
FIG. 1 schematically shows a rotary milking parlor together with an arrangement according to one embodiment of the invention.

We refer initially to FIG. 1 which schematically shows a milking installation 10 in which an arrangement for fetching teat cups according to one embodiment of the invention is included. The milking installation 10 also includes a rotary parlor 100 having milking stalls 101, 102, 103, 104, 105, 106, 107 and 108 respectively. Naturally, the invention is applicable to milking installations including an arbitrary number of milking stalls. Especially, the invention is applicable to installations wherein the parlor 10 includes any number of stalls smaller than or larger than the eight stalls shown in FIG. 2a. Each stall is associated with a respective teat cup magazine 120 that holds a set of teat cups matching the number of teats of the animals to be milked, i.e. typically the teat cup magazine 120 holds four teat cups.

The proposed arrangement, in turn, includes a control means 110, a robotic arm 150, a gripper means 140 and a remote detecting means 130. Each teat cup has a respective fixed position in the teat cup magazine 120. In other words, we presume that the location of each teat cup is defined by a respective set of coordinates relative to the teat cup magazine 120 holding the teat cup. We further presume that a positional relationship between a primary reference system for the robotic arm 150 and a secondary reference system for the teat cup magazine 120 is variable. Consequently, the positional relationship between the robotic arm 150 and the teat cups stored in the teat cup magazine 120 is likewise variable. In the case illustrated in FIG. 1, this variation depends on the fact that the parlor 100 is rotatable, and therefore the milking stalls 101, 102, 103, 104, 105, 106, 107 and 108 move relative to the robotic arm 105.

Turning now again to FIG. 2a, we see a block diagram over a first embodiment of the proposed arrangement for fetching teat cups. Here, teat cups 111, 112, 113 and 114 are located in the teat cup magazine 120.

The robotic arm 150 carries the gripper means 140, which in turn, is configured to hold at least one teat cup 111 during removal of this teat cup from the teat cup magazine 120. The position for the robotic arm 150 is defined in a primary reference system $X_1, Y_1, Z_1$, whereas the respective positions for the teat cups 111, 112, 113 and 114 are defined in a secondary reference system $X_2, Y_2, Z_2$. Hence, for example the position for the teat cup 111 in the secondary reference system $X_2, Y_2, Z_2$ are given by a set of coordinates $x_2, y_2, z_2$. Analogously, the positions for the remaining teat cups 112, 113 and 114 in the teat cup magazine 120 are given by a respective set of coordinates in the secondary reference system $X_2, Y_2, Z_2$. As mentioned above, the relationship between the first and secondary reference systems is variable, which renders it somewhat complicated for the gripper means 140 to grip the teat cups 111, 112, 113 and 114.

Figure 2A:
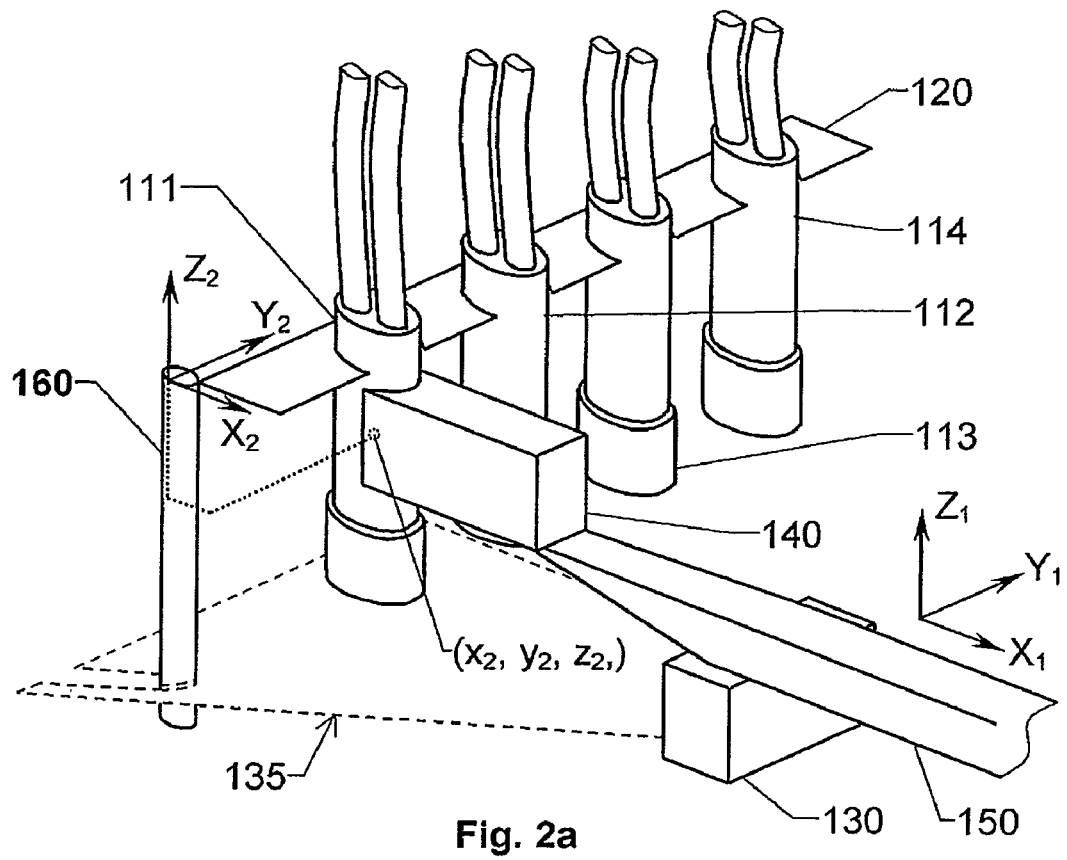
FIGS. 2a-c show block diagrams over the proposed arrangement according to three different embodiments of the invention.

The proposed control means 110 is configured to control the robotic arm 150 to move the gripper means 140 towards the teat cups 111, 112, 113 and 114, so as to enable the gripper means 140 to reach at least teat cup in the teat cup magazine 120. In FIG. 2a, we see that the gripper means 140 has taken hold of the teat cup 111. Once it has been confirmed that the gripper means 140 has a secure grip of the teat cup 111, the control means 110 is configured to control the robotic arm 150, such that the gripper means 140 removes the teat cup 111 from the teat cup magazine 120. Of course, if the gripper means 140 grips two or more teat cups simultaneously (or at least in parallel), these teat cups will be removed jointly from the teat cup magazine 120.

Preferably, during an initial phase, a human operator teaches the teat cup positions to the control means 110 (or more precisely programs these positions into the control means 110), for instance by controlling the robotic arm 150 in response to joystick manipulations such that the gripper means 140 becomes positioned relative to each teat cup, so that the gripper means 140 may grip and withdraw the teat cup in question from the teat cup magazine 120.

According to the invention, the arrangement includes a reference entity 160, which has a fixed spatial relationship to the teat cup magazine 120. Consequently, there is also a fixed spatial relationship between the reference entity 160 and each teat cup 111, 112, 113 and 114 that is stored in the teat cup magazine 120. In other words, the respective position for each teat cup 111, 112, 113 and 114 may be expressed in the secondary reference system $X_2, Y_2, Z_2$ relative to the reference entity 160. Preferably, these teat cup positions are stored in a database accessible by the control means 110. Then, based on the database entries, the control means 110 may control robotic arm 150 and its gripper means 140 towards a given teat cup.

To this aim, the remote detecting means 130 is configured to register wireless energy 135 reflected against objects in space, and based thereon position these objects in terms of direction and distance relative to the means 130. The remote detecting means 130 may utilize electromagnetic energy and/or acoustic energy emitted by a signal source, either co-located with the means 130, or separate from the means 130. Hence, in the former case, the remote detecting means 130 may include a laser source and detector, a radar, and/or a sonar; and in the latter case, the means 130 exclusively includes equivalent detecting means. This also means that the remote detecting means 130 may include an imaging device, e.g. in the form of a stereo camera. It is normally advantageous if the remote detecting means 130 is mounted on the robotic arm 150, e.g. as shown in FIG. 2a. However, according to the invention, it also conceivable that the remote detecting means 130 be physically separated from the robotic arm 150.

According to the invention, the reference entity 160 is configured to allow the remote detecting means 130 to receive wireless energy 135 reflected against the reference entity 160 while moving the robotic arm 150 towards the teat cups 111, 112, 113, 114 in order to remove one or more teat cups 111 from the teat cup magazine 120. In other words, the reference entity 160 has a design and a location relative to the teat cups 111, 112, 113, 114 and the robotic arm 150 so that the remote detecting means 130 can "see" the reference entity 160 when approaching the teat cup(s) 111 to be removed. In order to control the robotic arm 150 and its gripper means 140 appropriately, the control means 110 preferably consults the above-mentioned database, which describes the teat cup positions relative to a given reference entity 160.

For cost efficiency reasons, and to reduce the complexity of the overall design, it is further preferable if the remote detecting means 130 also is adapted to be used to position the teats during the process of attaching teat cups to the animal to be milked. This further requires a particular spatial relationship between the remote detecting means 130 and the gripper means 140. Consequently, said spatial relationship may likewise influence what is an appropriate position for the reference entity 160. For example, the gripper means 140 may be turned 180 degrees around a longitudinal axis of the robotic arm 150 relative to the position shown in FIG. 2a in connection with attaching teat cups to the teats. This may further imply that the reference entity 160 extends approximately one teat length below the teat cups 111, 112, 113 and 114 when placed in the teat cup magazine 120.

Preferably, the control means 110 includes, or is associated with, a computer readable medium M, e.g. in the form of a memory module, such that the control means 110 has access to the contents of this medium M. Furthermore, a program is recorded in the computer readable medium M, and the program is adapted to make the data processor 110 control the above-described process when the program is run on the processor 110.

In addition to being detectable by the remote detecting means 130, it is advantageous if the reference entity 160 is physically separated from each of the teat cups (i.e. 111, 112, 113 and 114 in FIG. 2a), so that the reference entity 160 is independent from the teat cups as such. Namely, this enhances the design's flexibility and robustness.

As can be seen in FIG. 2a, the reference entity 160 includes a first rod member 161 that has a general cylindrical shape. Of course, provided that the reference entity 160 fulfills the above-mentioned detection requirement and has a fixed spatial relationship to the teat cups 111, 112, 113 and 114 when stored in the teat cup magazine 120, any other shape/configuration of the entity 160 is equally well conceivable according to the invention.

Nevertheless, given that the reference entity 160 contains a first rod member 161, this member is preferably oriented such that a symmetry axis thereof is essentially parallel with a respective symmetry axis of each of the at least one teat cup 111, 112, 113, and 114 when located in the teat cup magazine 120. Namely, this facilitates an accurate positioning of the teat cups 111, 112, 113, and 114 in a plane being perpendicular to the teat cups. Hence, it is rendered a relatively straightforward task to fetch the teat cups automatically.

Figure 3:
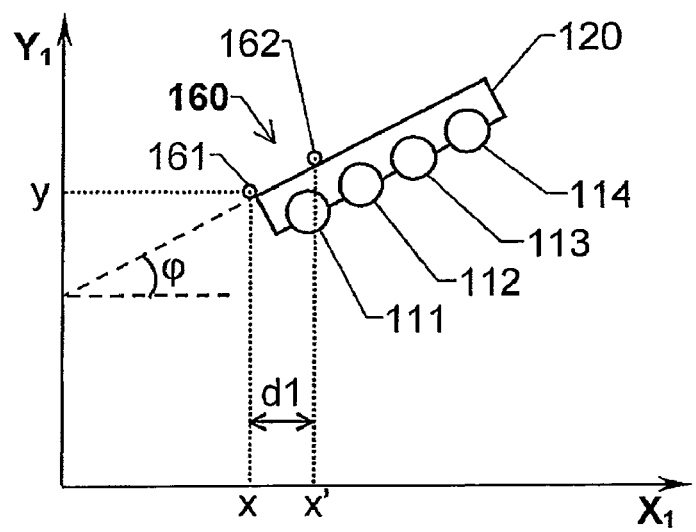
FIG. 3 illustrates how a rotation angle of a teat cup magazine may be determined according to one embodiment of the invention.

Now we turn briefly to FIG. 3, which illustrates the teat cup magazine 120 in a two-dimensional coordinate system $X_1, Y_1$ in which the robotic arm 150 operates. FIG. 3 also shows the teat cups 111, 112, 113, 114 and the first rod member 161 of the reference entity 160. Here, the teat cup positions are given by the coordinates x, y of the first rod member 161. According to one embodiment of the invention, the control means 110 is configured to determine a respective two-dimensional position estimate x, y for the teat cups 111, 112, 113 and 114 in a plane perpendicular to the symmetry axis of the first rod member 161. As described above with reference to FIG. 2a, the position estimates x, y for the teat cups 111, 112, 113 and 114 are based on wireless energy 135 reflected against the first rod member 161.

Figure 2B:
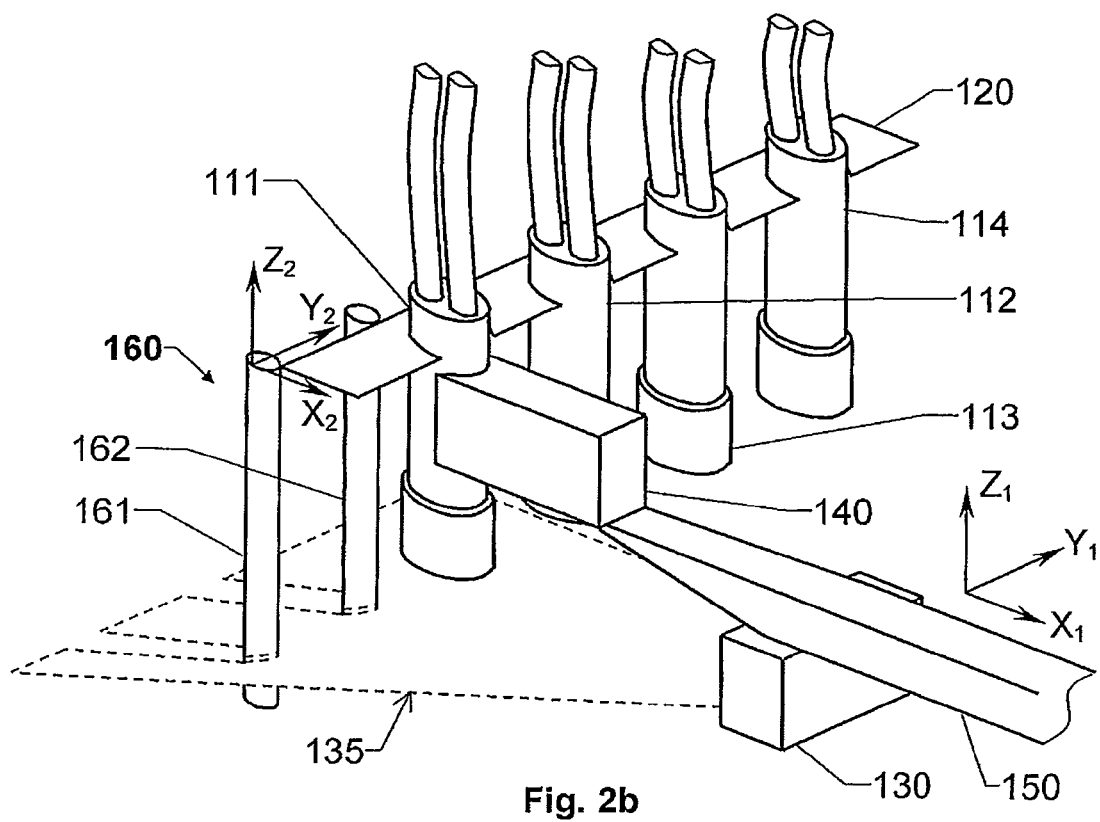

FIG. 2b shows a block diagram over an arrangement according to a second embodiment of the invention. All units, components and elements in FIG. 2b which have reference signs occurring also in FIGS. 1 and 2a designate the same units, components and elements as those described above with reference to these Figures. In FIG. 2b, the reference entity 160 includes a second rod member 162, which, analogous to the first rod member 161, preferably has a general cylindrical shape. Naturally, in the second embodiment of the invention, the first and second rod members 161 and 162 are preferably arranged such that wireless energy 135 reflected against both these members is receivable by the remote detecting means 140 while moving the robotic arm 150 towards the teat cups 111, 112, 113 and 114 in order to remove one or more teat cups from the teat cup magazine 120.

Moreover, in the second embodiment of the invention, the second rod member 162 is preferably oriented such that a symmetry axis thereof is essentially parallel with the symmetry axis of the first rod member 161. For example, the rod members 161 and 162 may be parallel with the symmetry axes of the teat cups 111, 112, 113 and 114 in the teat cup magazine 120 as illustrated in FIG. 3. One effect of this configuration is that, depending on a rotation angle $\phi$ of the teat cup magazine 120 and its teat cups 111, 112, 113 and 114 in the $X_1Y_1$-plane of the primary reference system, a distance d1 between a coordinate x and x' respectively for the rod members 161 and 162 registered by the remote detection means 130 from its position (e.g. on the robotic arm 150) varies. In the example illustrated in FIG. 3, a relatively small rotation angle $\phi$ ($-90° \leq \phi \leq 90°$) corresponds to a comparatively large distance d1; and vice versa, a relatively large rotation angle $\phi$ corresponds to a comparatively small distance d1.

Thus, according to this embodiment of the invention, the control means 110 is preferably configured to determine the rotation angle $\phi$ of the teat cups 111, 112, 113 and 114 in the $X_1Y_1$-plane of the primary reference system $X_1, Y_1, Z_1$ (i.e. in respect of the robotic arm 150). Due to the arrangement of the rod members 161 and 162, the $X_1Y_1$-plane is here perpendicular to the symmetry axes of the first and second rod members 161 and 162.

Figure 2C:
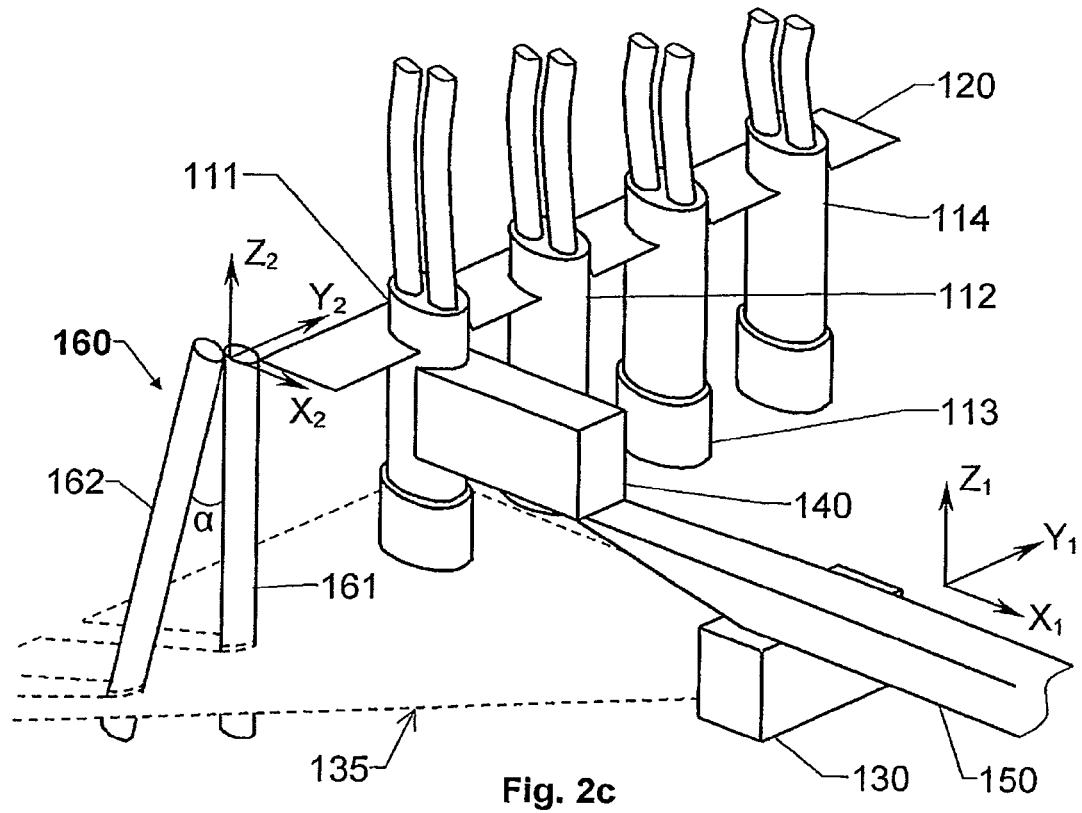
Figure 4:
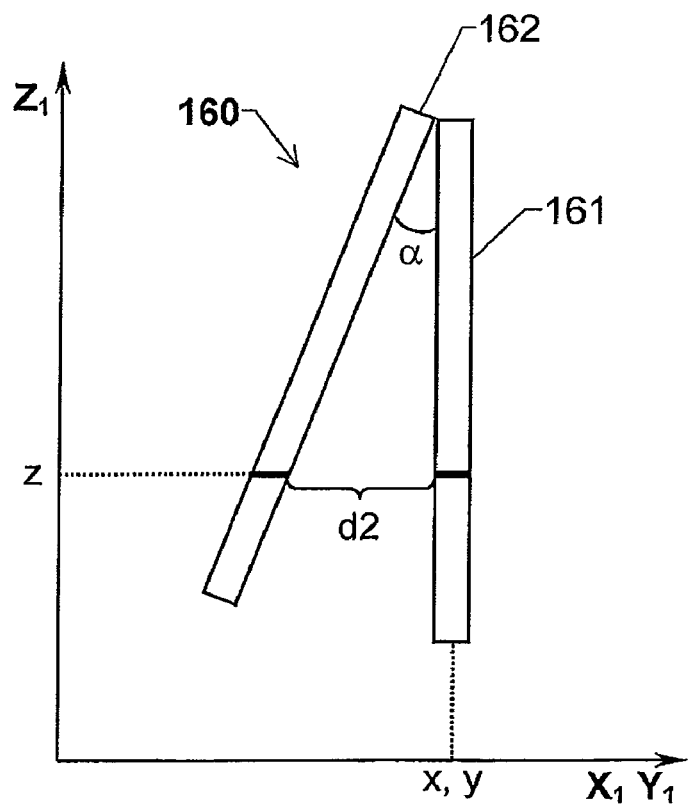
FIG. 4 illustrates how an elevation measure of a teat cup magazine may be determined according to one embodiment of the invention.

FIG. 2c shows a block diagram over an arrangement according to a third embodiment of the invention. All units, components and elements in FIG. 2c which have reference signs occurring also in FIGS. 1, 2a and 2b designate the same units, components and elements as those described above with reference to these Figures. Also in the third embodiment of the invention the reference entity 160 includes two rod members 161 and 162. Here, however, the second rod member 162 has an angle α to the first rod member 161, such that the symmetry axes of the first and second rod members 161 and 162 are non-parallel to one another. FIG. 4 specifically illustrates this feature in a coordinate system expressing the $X_1Y_1$-plane along the horizontal axis, and a dimension $Z_1$ perpendicular to the $X_1Y_1$-plane along the vertical axis.

Since both the rod members 161 and 162 have general cylindrical shapes, a registered distance d2 between these members can be directly translated into an elevation z in the $Z_1$ dimension. Thus, provided that the topmost parts of the rod members 161 and 162 are closer to one another than their bottommost parts, a relatively long distance d2 corresponds to a relatively low elevation z of the teat cups 111, 112, 113 and 114, and vice versa. Consequently, according to this embodiment of the invention, the control means 110 is preferably configured to determine a respective three-dimensional position estimate x, y, z of the teat cups 111, 112, 113 and 114 in the teat cup magazine 120 in the primary reference system $X_1, Y_1, Z_1$ based on wireless energy 135 reflected against the first and second rod members 161 and 162 respectively.

Figure 5:
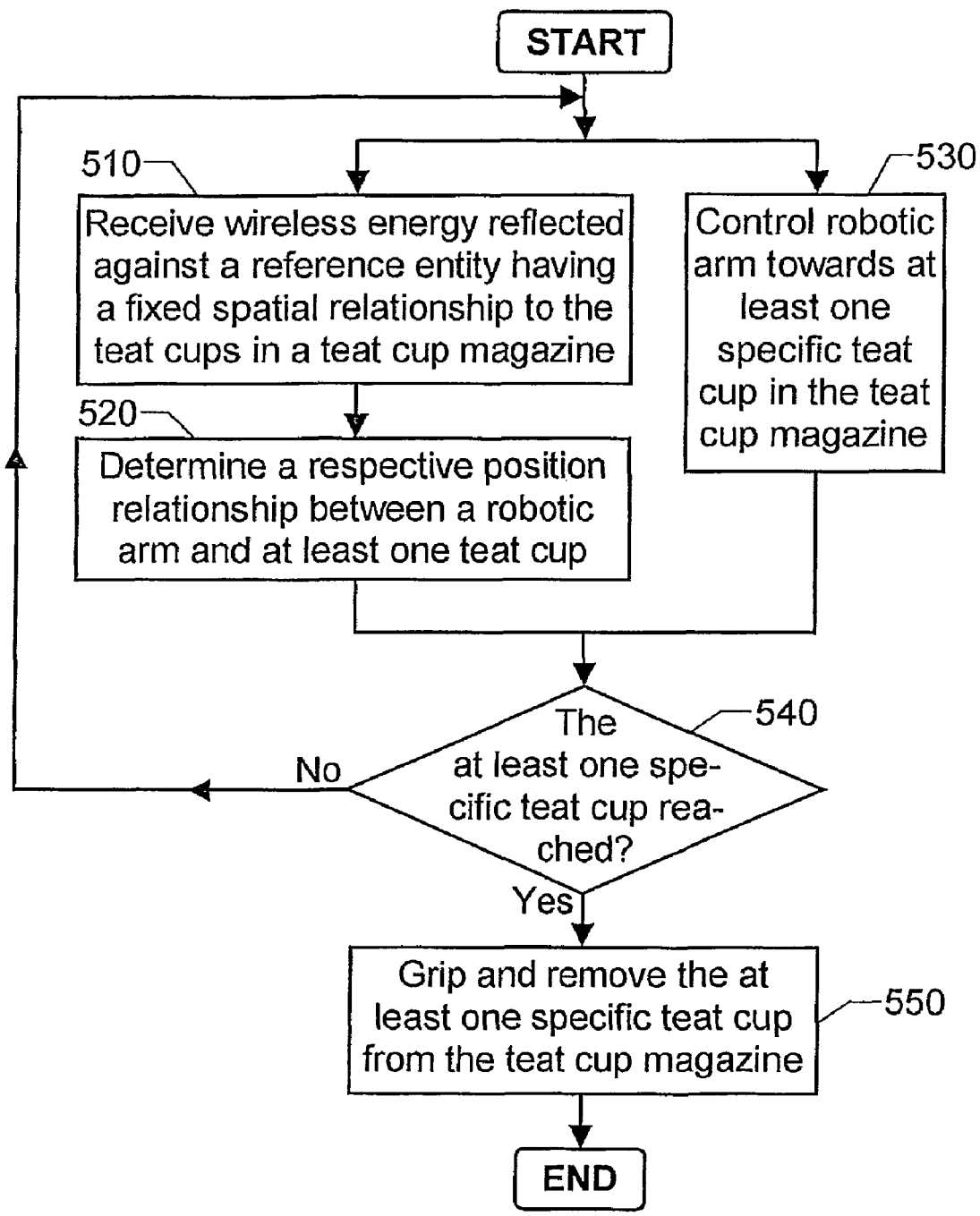
FIG. 5 illustrates, by means of a flow diagram, the general method according to the invention.

In order to sum up, we will now describe the general method according to the invention with reference to the flow diagram in FIG. 5.

A first step 510 receives wireless energy (e.g. represented by electromagnetic and/or acoustic waves) reflected against a reference entity having a fixed spatial relationship to at least one teat cup in a teat cup magazine. Hence, for instance based on information in a database which describes a respective position for each teat cup relative to a reference entity, it is possible to determine the position for a specific teat cup given that the position for its reference entity is known.

Based on the received wireless energy, a step 520 determines a position relationship between a robotic arm and at least one teat cup, e.g. by consulting a database of the above-mentioned kind. Here, we assume that the robotic arm position is defined in a primary reference system, the teat cup positions are defined in a secondary reference system, and that the relationship between the first and second reference systems is variable.

In parallel with steps 510 and 520, a step 530 controls the robotic arm towards at least one teat cup being located in a teat cup magazine. The robotic arm, in turn, carries a gripper means configured to grip and remove at least teat cup from the teat cup magazine.

Subsequent to steps 520 and 530, a step 540 investigates whether or not the gripper means has reached the at least teat cup aimed for in step 530. If this is found not to be the case, the procedure loops back to steps 510 and 520. Otherwise, a step 550 follows in which the gripper means is controlled to grip and remove the at least one teat cup from the teat cup magazine. Thereafter, the procedure ends. In practice, of course, other steps normally follow, which are not part of the present invention, such as attaching the at least teat cup to the teat(s) of an animal, cleaning of the at least teat cup etc.

All of the process steps, as well as any sub-sequence of steps, described with reference to FIG. 5 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention primarily is intended to be utilized in connection with cow milking, the invention is equally well adapted for testing milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia, or any other country.

The invention is not restricted to the described embodiments in the figures, but may be varied freely within the scope of the claims.

The invention claimed is:

1. An arrangement for fetching at least one teat cup (111, 112, 113, 114) located in a teat cup magazine (120), each said at least one teat cup having a respective fixed position in the teat cup magazine (120), the arrangement comprising:
   a remote detecting means (130) configured i) to register wireless energy (135) reflected against objects in space, and ii) based on the registered wireless energy, determine a position of said objects in terms of direction and distance relative to the remote detecting means (130);
   a gripper means (140) configured to hold said at least one teat cup (111) during removal of said at least one teat cup (111) from the teat cup magazine (120);
   a robotic arm (150) carrying the gripper means (140), there being a primary reference system ($X_1, Y_1, Z_1$) for the robotic arm (150);

a control means (110) configured to i) control the robotic arm (150) to move the gripper means (140) towards said at least one teat cup (111, 112, 113, 114) so as to enable the gripper means (140) to reach said at least one teat cup (111) in the teat cup magazine (120), and ii) control the gripper means (140) to remove said at least one teat cup (111) from the teat cup magazine (120); and a reference entity (160) having a fixed spatial relationship to each of said at least one teat cup (111, 112, 113, 114) and the teat cup magazine (120), the reference entity (160) establishing a secondary reference system ($X_2, Y_2, Z_2$) for said at least one teat cup (111, 112, 113, 114), the reference entity (160) being configured to allow the remote detecting means (130) to receive wireless energy (135) reflected against the reference entity (160) while moving the robotic arm (150) towards said at least one teat cup (111, 112, 113, 114) for removing said at least one teat cup (111) from the teat cup magazine (120), wherein a positional relationship between the primary reference system ($X_1, Y_1, Z_1$) for the robotic arm (150) and the secondary reference system ($X_2, Y_2, Z_2$) for said at least one teat cup (111, 112, 113, 114), and is variable, wherein the reference entity (160) is physically separated from each said at least one teat cup (111, 112, 113, 114), wherein the reference entity (160) comprises a first rod member (161) and a second rod member (162) spaced apart from said first rod member (161).

2. The arrangement according to claim 1, wherein the first rod member (161) is oriented such that a symmetry axis of the first rod member is essentially parallel with a respective symmetry axis of each said at least one teat cup (111, 112, 113, 114) when each said at least one teat cup is located in the teat cup magazine (120).

3. The arrangement according to claim 2, wherein the control means (110) is configured to determine a respective two-dimensional position estimate (x, y) of said at least one teat cup (111, 112, 113, 114) in a plane perpendicular to the symmetry axis of the first rod member (161), the position estimate (x, y) being based on wireless energy (135) reflected against the first rod member (161).

4. The arrangement according to claim 1, wherein the remote detecting means (130) comprises at least one of a laser source and detector, a radar, a sonar, and an imaging device.

5. A milking installation (10) configured to automatically extract milk from at least one animal, comprising at least one arrangement according to claim 1.

6. The arrangement according to claim 1, wherein the first and second rod members (161, 162) are arranged such that wireless energy reflected against both the first and second rod members (161, 162) is receivable by the remote detecting means (140) while moving the robotic arm (150) towards said at least one teat cup (111, 112, 113, 114) for removing said at least one teat cup (111) from the teat cup magazine (120).

7. The arrangement according to claim 6, wherein the second rod member (162) is oriented such that a symmetry axis thereof is essentially parallel with a symmetry axis of the first rod member (161).

8. The arrangement according to claim 6, wherein,
the control means (110) is configured to determine a rotation angle ($\phi$) of said at least one teat cup (111, 112, 113, 114) in a first plane ($X_1, Y_1$,) in the primary reference system,
the first plane ($X_1, Y_1$,) is perpendicular to symmetry axes of the first and second rod members (161, 162), and
the determination of the rotation angle ($\phi$) is based on the wireless energy (135) reflected against both the first and second rod members (161, 162).

9. The arrangement according to claim 6, wherein,
the second rod member (162) has an angle ($\alpha$) to the first rod member (161) such that symmetry axes of the first and second rod members (161, 162) are non-parallel to one another, and
the control means (110) is configured to determine a three-dimensional position estimate (x, y, z) of said at least one teat cup (111, 112, 113, 114) in the primary reference system ($X_1, Y_1, Z_1$) based on the wireless energy (135) reflected against both the first and second rod members (161, 162).

10. The arrangement according to claim 1, wherein the first rod member (161) and the second rod member (162) each have a general cylindrical shape.

11. An arrangement for fetching at least one teat cup (111, 112, 113, 114) located in a teat cup magazine (120), each said at least one teat cup having a respective fixed position in the teat cup magazine (120), the arrangement comprising:
a remote detecting means (130) configured i) to register wireless energy (135) reflected against objects in space, and ii) based on the registered wireless energy, determine a position of said objects in terms of direction and distance relative to the remote detecting means (130);
a gripper means (140) configured to hold said at least one teat cup (111) during removal of said at least one teat cup (111) from the teat cup magazine (120);
a robotic arm (150) carrying the gripper means (140), there being a primary reference system ($X_1, Y_1, Z_1$) for the robotic arm (150);
a control means (110) configured to i) control the robotic arm (150) to move the gripper means (140) towards said at least one teat cup (111, 112, 113, 114) so as to enable the gripper means (140) to reach said at least one teat cup (111) in the teat cup magazine (120), and ii) control the gripper means (140) to remove said at least one teat cup (111) from the teat cup magazine (120); and
a reference entity (160) having a fixed spatial relationship to each of said at least one teat cup (111, 112, 113, 114) and the teat cup magazine (120), the reference entity (160) establishing a secondary reference system ($X_2, Y_2, Z_2$) for said at least one teat cup (111, 112, 113, 114), the reference entity (160) being configured to allow the remote detecting means (130) to receive wire-less energy (135) reflected against the reference entity (160) while moving the robotic arm (150) towards said at least one teat cup (111, 112, 113, 114) for removing said at least one teat cup (111) from the teat cup magazine (120),
wherein a positional relationship between the primary reference system ($X_1, Y_1, Z_1$) for the robotic arm (150) and the secondary reference system ($X_2, Y_2, Z_2$) for said at least one teat cup (111, 112, 113, 114) is variable,
wherein the reference entity (160) is physically separated from each said at least one teat cup (111, 112, 113, 114),
wherein the reference entity (160) comprises a first rod member (161) having a general cylindrical shape, and
wherein the reference entity (160) comprises a second rod member (162) having a general cylindrical shape.

12. The arrangement according to claim 11, wherein the first and second rod members (161, 162) are arranged such that wireless energy reflected against both the first and second rod members (161, 162) is receivable by the remote detecting means (140) while moving the robotic arm (150) towards said at least one teat cup (111, 112, 113, 114) for removing said at least one teat cup (111) from the teat cup magazine (120).

13. The arrangement according to claim 12, wherein the second rod member (162) is oriented such that a symmetry axis thereof is essentially parallel with a symmetry axis of the first rod member (161).

14. The arrangement according to claim 12, wherein,
the control means (110) is configured to determine a rotation angle ($\phi$) of said at least one teat cup (111, 112, 113, 114) in a first plane ($X_1, Y_1$,) in the primary reference system,
the first plane ($X_1, Y_1$,) is perpendicular to symmetry axes of the first and second rod members (161, 162), and
the determination of the rotation angle ($\phi$) is based on wireless energy (135) reflected against both the first and second rod members (161, 162).

15. The arrangement according to claim 12, wherein the second rod member (162) has an angle ($\alpha$) to the first rod member (161) such that the symmetry axes of the first and second rod members (161, 162) are non-parallel to one another.

16. The arrangement according to claim 15, wherein the control means (110) is configured to determine a three-dimensional position estimate (x, y, z) of said at least one teat cup (111, 112, 113, 114) in the primary reference system ($X_1, Y_1, Z_1$) based on wireless energy (135) reflected against both the first and second rod members (161, 162).

17. A method of fetching at least one teat cup (111, 112, 113, 114) located in a teat cup magazine (120), each said at least one teat cup having a respective fixed position in the teat cup magazine (120), the method comprising:
remotely detecting, via a remote detecting means (130), a respective direction and distance to objects located in space based on wireless energy (135) reflected against said objects;
controlling a robotic arm (150) carrying a gripper means (140) towards said at least one teat cup (111, 112, 113, 114) such that the gripper means (140) is enabled to reach at least teat cup (111) in the teat cup magazine (120);
controlling the gripper means (140) to remove at least teat cup (111) from the teat cup magazine (120); and
controlling the gripper means (140) to hold said at least one teat cup (111) while removing said at least one teat cup (111) from the teat cup magazine (120), wherein,
a positional relationship between a primary reference system ($X_1, Y_1, Z_1$) for the robotic arm (150) and a secondary reference system ($X_2, Y_2, Z_2$) for said at least one teat cup (111, 112, 113, 114) is variable,
a reference entity (160) has a fixed spatial relationship to said at least one teat cup (111, 112, 113, 114) and the teat cup magazine, the reference entity (160) establishing the secondary reference system ($X_2, Y_2, Z_2$) for said at least one teat cup (111, 112, 113, 114), and in said controlling steps, the reference entity (160) being configured to allow the remote detecting means (130) to receive wireless energy (135) reflected against the reference entity (160) while moving the robotic arm (150) towards said at least one teat cup (111, 112, 113, 114) for removing said at least one teat cup (111) from the teat cup magazine (120), said robotic arm is controlled based on received wireless energy (135) reflected against the reference entity (160) while moving the robotic arm (150) towards said at least one teat cup (111) in the teat cup magazine (120) for removing said at least one teat cup (111) therefrom,
wherein the reference entity (160) comprises a first rod member (161) and a second rod member (162) spaced apart from said first rod member (161).

18. The method according to claim 17, comprising the further step of orienting the first rod member (161) such that a symmetry axis of the first rod member is essentially parallel with a respective symmetry axis of each said at least one teat cup (111, 112, 113, 114) when each said at least one teat cup is located in the teat cup magazine (120).

19. The method according to claim 18, comprising the further steps of:
receiving wireless energy (135) reflected against the first rod member (161); and
based on the received wireless energy (135) reflected against the first rod member, determining a two-dimensional position estimate (x, y) of the teat cup magazine (120) in a plane perpendicular to the symmetry axis of the first rod member (161).

20. The method according to claim 17, wherein the first rod member (161) and the second rod member (162) each have a general cylindrical shape.

21. The method according to claim 20, comprising the further step of arranging the first and second rod members (161, 162) such that wireless energy (135) reflected against both the first and second rod members (161, 162) is receivable by the remote detecting means (130) while moving the robotic arm (150) towards said at least one teat cup (111, 112, 113, 114) for removing said at least one teat cup (111) from the teat cup magazine (120).

22. The method according to claim 21, comprising the further step of orienting the second rod member (162) such that a symmetry axis of the second rod member is essentially parallel with the symmetry axis of the first rod member (161).

23. The method according to claim 21, comprising the further steps of:
receiving wireless energy (135) reflected against both the first and second rod members (161, 162); and
based on the received wireless energy reflected against both the first and second rod members, determining a rotation angle ($\phi$) of said at least one teat cup (111, 112, 113, 114) in a plane ($X_1, Y_1$,) in the primary reference system, which plane ($X_1, Y_1$,) is perpendicular to the symmetry axes of the first and second rod members (161, 162).

24. The method according to claim 21, wherein the second rod member (162) has an angle ($\alpha$) to the first rod member (161) such that the symmetry axes of the first and second rod members (161, 162) are non-parallel to one another.

25. The method according to claim 24, comprising the further steps of:
receiving wireless energy (135) reflected against both the first and second rod members (161, 162); and
based on the received wireless energy reflected against both the first and second rod members, determining a three-dimensional position estimate (x, y, z) of said at least one teat cup (111, 112, 113, 114) in the primary reference system ($X_1, Y_1, Z_1$).

26. A non-transitory computer readable storage medium storing instructions loadable into an internal memory (M) of a computer and executable by the computer to control the computer to perform the steps of claim 17.

* * * * *